US010113243B2

United States Patent
Chung et al.

(10) Patent No.: US 10,113,243 B2
(45) Date of Patent: Oct. 30, 2018

(54) MANUFACTURING METHOD OF CASING OF ELECTRONIC DEVICE

(71) Applicant: HTC Corporation, Taoyuan (TW)

(72) Inventors: Cheng-Han Chung, Taoyuan County (TW); Chao-Feng Wan, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 285 days.

(21) Appl. No.: 14/985,452

(22) Filed: Dec. 31, 2015

(65) Prior Publication Data

US 2016/0108535 A1    Apr. 21, 2016

Related U.S. Application Data

(62) Division of application No. 14/155,355, filed on Jan. 15, 2014, now Pat. No. 9,464,360.

(51) Int. Cl.

| H05K 3/02 | (2006.01) |
|---|---|
| H05K 3/10 | (2006.01) |
| C25D 5/02 | (2006.01) |
| G06F 1/16 | (2006.01) |

(Continued)

(52) U.S. Cl.
CPC ................ C25D 5/02 (2013.01); C25D 7/00 (2013.01); G06F 1/1656 (2013.01); G06F 1/18 (2013.01); G06F 1/181 (2013.01); Y10T 29/49155 (2015.01)

(58) Field of Classification Search
CPC .... C25D 5/02; C25D 7/00; G06F 1/18; G06F 1/1656; G06F 1/181; Y10T 29/49016; Y10T 29/49018; Y10T 29/49105; Y10T 29/49155

USPC .......... 29/601, 622, 846; 174/255; 361/679; 338/4

See application file for complete search history.

(56) References Cited

U.S. PATENT DOCUMENTS

| 5,165,282 A * | 11/1992 | Nakamura | ............ G01L 9/0042 338/4 |
|---|---|---|---|
| 8,692,790 B2 * | 4/2014 | Yi | ........................... G06F 3/044 29/846 |
| 8,733,648 B2 | 5/2014 | Melbrod et al. | |

(Continued)

FOREIGN PATENT DOCUMENTS

| CN | 100586019 | 1/2010 |
|---|---|---|
| CN | 103997928 | 8/2014 |

(Continued)

OTHER PUBLICATIONS

"Office Action of China Counterpart Application," dated Mar. 1, 2017, p. 1-p. 7, in which the listed references were cited.

(Continued)

Primary Examiner — Donghai D Nguyen
(74) Attorney, Agent, or Firm — JCIPRNET

(57) ABSTRACT

A manufacturing method of a casing of an electronic device including the following steps is provided. First, a casing body is formed by an injection molding technology, and the casing body includes a button portion. Thereafter, a sensing assembly is electroplated on an inner surface of the casing body. The sensing assembly includes a first conductive line and two first contacts. The first conductive line forms a strain sensing pattern on the button portion, and the two first contacts connect to two ends of the first conductive line, respectively.

4 Claims, 7 Drawing Sheets

(51) Int. Cl.
*G06F 1/18* (2006.01)
*C25D 7/00* (2006.01)

(56) References Cited

U.S. PATENT DOCUMENTS

| | | |
|---|---|---|
| 8,780,537 B2 | 7/2014 | Sokola et al. |
| 2006/0021453 A1 | 2/2006 | Kutlu |
| 2006/0171104 A1* | 8/2006 | Vayssiere .............. G06F 1/1626 361/679.21 |
| 2006/0176280 A1 | 8/2006 | Griffin |
| 2010/0061055 A1 | 3/2010 | Dabov et al. |
| 2012/0217145 A1 | 8/2012 | Yi et al. |
| 2013/0146661 A1 | 6/2013 | Melbrod et al. |
| 2013/0215056 A1* | 8/2013 | Johansson .............. G01R 27/14 345/173 |
| 2014/0062799 A1* | 3/2014 | Sutherland ........... H01Q 1/2266 29/601 |
| 2014/0331741 A1 | 11/2014 | Shah et al. |
| 2015/0242012 A1 | 8/2015 | Petcavich et al. |

FOREIGN PATENT DOCUMENTS

| | | |
|---|---|---|
| JP | 2001283679 | 10/2001 |
| TW | 226753 | 7/1994 |
| TW | 201202902 | 1/2012 |

OTHER PUBLICATIONS

"Office Action of US Parent Application", dated Feb. 16, 2016, p. 1-p. 19, in which the listed references(Ref. 1-7) were cited.
"Office Action of Taiwan Counterpart Application", dated May 5, 2016, p. 1-p. 6, in which the listed references(Ref. 1, 8-10) were cited.

* cited by examiner

MANUFACTURING METHOD OF CASING OF ELECTRONIC DEVICE

CROSS-REFERENCE TO RELATED APPLICATION

This application is a divisional application of and claims the priority benefit of U.S. application Ser. No. 14/155,355, filed on Jan. 15, 2014, now U.S. Pat. No. 9,464,360. The entirety of the above-mentioned patent application is hereby incorporated by reference herein and made a part of this specification.

BACKGROUND OF THE INVENTION

Field of the Invention

The application generally relates to a manufacturing method of a casing of an electronic device, and more particularly, to a manufacturing method of a casing of an electronic having seamless button design device.

Description of Related Art

In recent years, technology products are mainly developed to satisfy public demands in mobility and functionality, and that is why portable electronic devices such as personal digital assistants (PDA), smart mobile phones, tablet PCs, and notebook (NB) have become mainstream in the market nowadays.

Generally, a portable electronic device is usually included with buttons disposed on a casing body, and switch elements corresponding to the buttons are provided inside the casing body. The buttons and the switch elements are coupled to each another, and the switch elements are controlled by pressing the buttons, so as to achieve functions such as power switch, volume control, image capturing, or scroll control of display page. Therefore, the casing body of the portable electronic device is required to include external openings correspondingly for disposing the button, so as facilitate user in operations.

However, above-said disposing method may cause excessive waste of disposing space inside the portable electronic device, and an assembly process thereof is also more complex, leading to problems such as high in manufacturing difficulty, long in process time, and low in assembly yield. On the other hand, dust and moisture may easily enter inside the portable electronic device through gaps between the buttons and the external openings to significantly reduce lifetime of electronic elements, and affect normal operating functions thereof.

SUMMARY OF THE INVENTION

The application is directed to a manufacturing method of a casing of an electronic device, capable of simplifying processing steps, reducing assembly time, lowering manufacturing costs and improving assembly yield, as well as achieving the seamless button design, such that integrity on external appearance of the electronic device is maintained, and dust and moisture are also prevented from entering inside the electronic device thereby ensuring lifetime and reliability of the electronic device.

A manufacturing method of a casing of an electronic device is proposed by the application. First, a casing body is formed by an injection molding technology, and the casing body includes a button portion. Thereafter, a sensing assembly is electroplated on an inner surface of the casing body. The sensing assembly includes a first conductive line and two first contacts. The first conductive line forms a strain sensing pattern on the button portion, and the two first contacts connect to two ends of the first conductive line, respectively.

Based on above, the strain sensing assembly is manufactured on inner side of the button portion of the casing body (i.e., buttons) by a laser direct structuring (LDS) according to the application, such that the functions of the buttons may be realized by the user pressing the button portion of the casing body. In other words, the application is capable of realizing the functions of the buttons without disposing the buttons or other independent sensing elements additionally on the casing of the electronic device. As results, processing steps may be significantly simplified; assembly time may be reduced; manufacturing costs may be lowered; and assembly yield may be improved. On the other hand, there is no gap between the casing body and regions that realize the functions of the buttons since the electronic device of the application adopts the seamless button design, not only is integrity on external appearance of the electronic device maintained, dust and moisture are also prevented from entering inside the electronic device thereby ensuring lifetime and reliability of the electronic device.

To make the above features and advantages of the present application more comprehensible, several embodiments accompanied with drawings are described in detail as follows.

DESCRIPTION OF THE EMBODIMENTS

Figure 1:
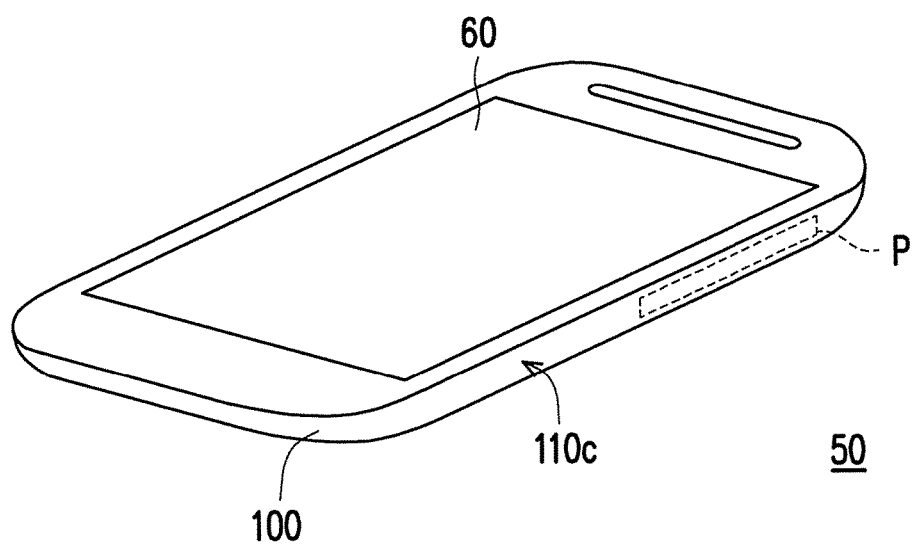
FIG. 1 is a schematic view of an electronic device according to an embodiment of the application.
Figure 2:
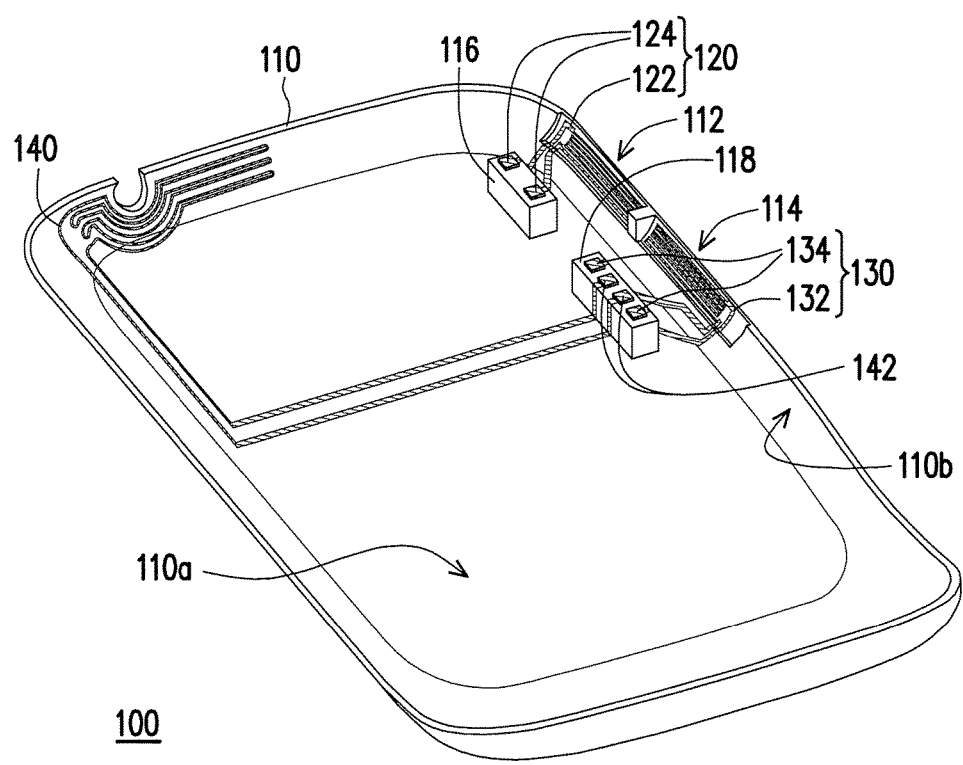
FIG. 2 is a schematic view of the casing depicted in FIG. 1.
Figure 3A:
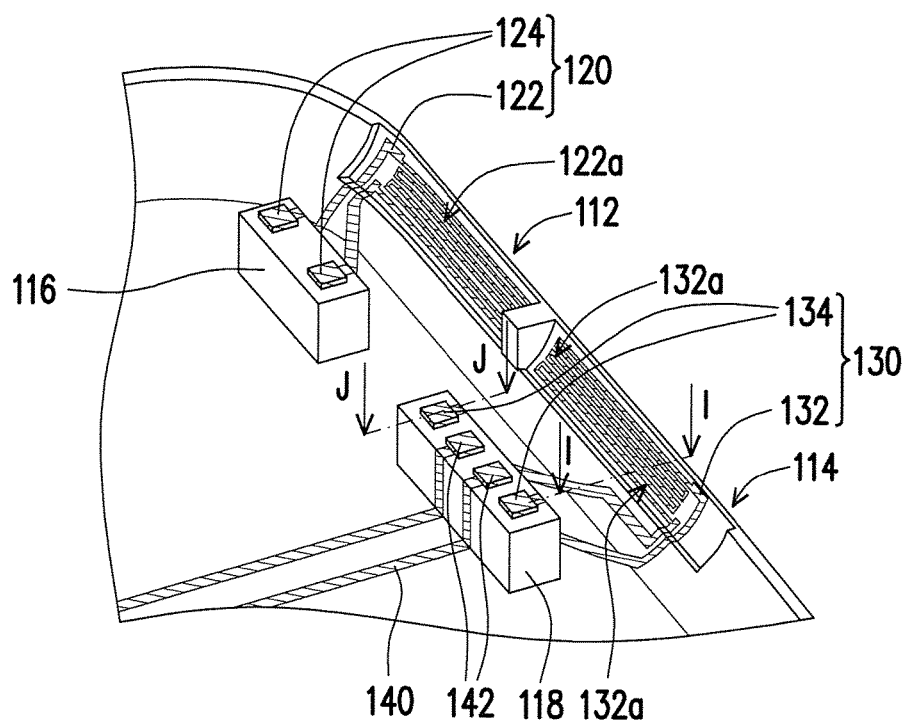
FIG. 3A is a partially enlarged view of the casing depicted in FIG. 2.

FIG. 1 is a schematic view of an electronic device according to an embodiment of the application. FIG. 2 is a schematic view of the casing depicted in FIG. 1. FIG. 3A is a partially enlarged view of the casing depicted in FIG. 2. Referring to FIG. 1 to FIG. 3A, in the present embodiment, an electronic device 50 includes a body 60 and a casing 100. The casing 100 encases the body 60. The casing 100 includes a casing body 110 and sensing assemblies 120 and 130. The casing body 110 includes button portions 112 and 114. The sensing assembly 120 includes a first conductive line 122 and two first contacts 124, and the sensing assembly 130 includes a first conductive line 132 and two first contacts 134. The first conductive lines 122 and 132 are disposed on an inner surface of the casing body 110, and the first conductive lines 122 and 132 form strain sensing patterns 122a and 132a on the button portions 112 and 114, respectively. The first contacts 124 and 134 are disposed on the inner surface of the casing body 110, and connected to two ends of the first conductive lines 122 and 132, respectively. The first contacts 124 and 134 are electrically connected to the body 60, respectively. The strain sensing patterns 122a and 132a are adapted to result a resistance variation accompanied with a deformation of the button portions 112 and 114, respectively when the button portions 112 and 114 are deformed, so as to generate an electrical signal. More specifically, the casing body 110 includes a base 110a and a sidewall 110b stood around the base 110a, in which the button portions 112 and 114 are located on the sidewall 110b, and the first contacts 124 and 134 are located on the base 110a, for example.

Generally, the electronic device 50 is, for example, a smart phone, a PDA, a table PC, and the casing body 110 of the casing 100 is, for example, a plastic casing body or a carbon fiber casing body, or a complex casing body composed of plastic and metal. On the other hand, a material of the sensing assemblies 120 and 130 may be, for example, a metal with favorable conductivity such as copper, nickel or silver, which may be formed on the inner surface of the casing body 110 by a laser direct structuring (LDS) technology. The laser direct structuring (LDS) technology refers to a manufacturing technology with 3D-Molded Interconnect Device (3D-MID) of laser processing, injection molding and electroplating process. Such manufacturing technology is usually applied in fields of handset antenna, automotive electronic circuit, ATM casing and medical hearing aid.

A manufacturing method of said casing having the sensing assemblies 120 and 130 is roughly described as follows. First, the casing body 110 is formed by an injection molding technology, and the button portions 112 and 114 are defined on the casing body 110. In the subsequent processes, the sensing assemblies 120 and 130 are electroplated on the inner surface of the casing body 110 corresponding to the button portions 112 and 114, in which a wiring layout and a disposition of the sensing assemblies 120 and 130 may refer to aforesaid description which is omitted herein.

Further description regarding a method of electroplating the sensing assemblies 120 and 130 on the casing body 110 is provided as below. First, a roughening process (e.g., activating the inner surface by using a method of laser activation) is performed on the inner surface of the casing body 110, so as to facilitate the subsequent electroplating processes. Accordingly, the inner surface may include microstructures (not illustrated) corresponding to the sensing assembly 120 (including the first conductive line 122 and the first contacts 124) and the sensing assembly 130 (including the first conductive line 132 and the first contacts 134), such that wirings and contacts formed in the subsequent processes may be fixed on the inner surface.

Figure 3B:
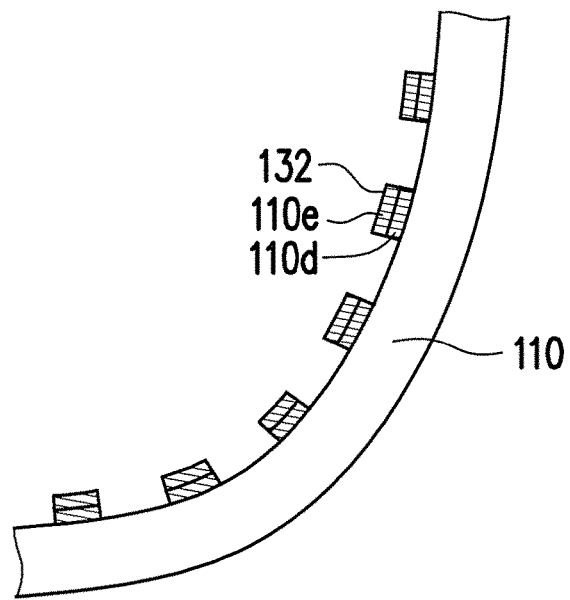
FIG. 3B is a cross-sectional view of the casing depicted in FIG. 3A taken along a sectional line I-I.
Figure 3C:
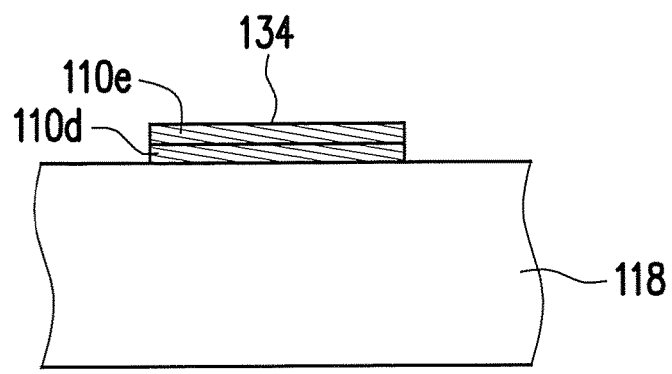
FIG. 3C is a cross-sectional view of the casing depicted in FIG. 3A taken along a sectional line J-J.

FIG. 3B is a cross-sectional view of the casing depicted in FIG. 3A taken along a sectional line I-I. FIG. 3C is a cross-sectional view of the casing depicted in FIG. 3A taken along a sectional line J-J. Thereafter, the casing body 110 is placed into a solution containing metal particles, and the metal particles may be metal ions of tin, silver, copper, chromium or nickel, so that said metal particles may be attached to the roughened and activated inner surface, thereby forming a seed metal layer 110d. Lastly, the casing body 110 is placed into a plating solution, so as an electroplating metal layer 110e is formed on the seed metal layer 110d by electroplating (e.g., chemical plating). The electroplating metal layer 110e is attached to the seed metal layer 110d, and the sensing assemblies 120 and 130 may include said two layers of the seed metal layer 110d and the electroplating metal layer 110e (as shown in FIG. 3B and FIG. 3C, respectively), and may be fixed stably on the casing body 110 by the microstructures on the roughened inner surface. Up to this stage, the manufacture of the casing 100 is substantially completed.

Herein, the strain sensing patterns 122a and 132a respectively formed by the first conductive lines 122 and 132 are, for example, grid patterns arranged in a zigzag manner. Further, in comparison with a common strain gauge having a thickness approximately between 200 μm to 300 μm, a thickness of the sensing assemblies 120 and 130 is approximately between 0.5 μm to 50 μm, which is more in line with design requirements in miniaturization of the existing electronic products.

In the present embodiment, the casing 100 further includes a second conductive line and second contacts 142, and the second conductive line is, for example, an antenna coil 140. The antenna coil 140 is disposed on the inner surface of the casing body 110. The second contacts 142 are connected to two ends of the antenna coil 140, respectively. More specifically, a material of the antenna coil 140 and the second contacts 142 may also be, for example, a metal with favorable conductivity such as copper, nickel or silver, which may be formed on the inner surface of the casing body 110 by the laser direct structuring (LDS) technology.

In other words, the antenna coil 140 and the second contacts 142 may be formed on the inner surface of the casing body 110 while electroplating the sensing assemblies 120 and 130 on the inner surface of the casing body 110 by using a manufacturing method identical to the method of electroplating the sensing assemblies 120 and 130 on the inner surface of the casing body 110. Accordingly, the antenna coil 140 and the second contacts 142 may also include said two layers of the seed metal layer 110d and the electroplating metal layer 110e as shown in FIG. 3B and FIG. 3C, and a thickness thereof is approximately between 0.5 μm to 50 μm.

In the present embodiment, the casing body 110 includes blocks 116 and 118. Generally, the blocks 116 and 118 are integrally formed with the casing body 110 and protruded from the inner surface of the base 110a of the casing body 110. The first contacts 124 and 134 are disposed on top surfaces of the blocks 116 and 118, respectively. The first conductive lines 122 and 132 further extend along the inner surface of the casing body 110 and respective lateral surface of the blocks 116 and 118 to respective top surface of the blocks 116 and 118, so as to connect to the first contacts 124 and 134, respectively.

On the other hand, the second contacts 142 are, for example, disposed on the top surface of the block 118 together with the first contacts 134, and the first conductive line 132 and the antenna coil 140 respectively extend along the inner surface of the casing body 110 and the lateral surface of the block 118 to the top surface of the block 118, so as to connect to the first contacts 134 and the second contacts 142, respectively. Naturally, in other possible embodiments, the disposition of the first contacts 124 and 134 and the second contacts 142 may also be adjusted based on actual requirements. For instance, the second contacts 142 and the first contacts 124 are commonly disposed on the top surface of the block 116, or the first contacts 124 and 134 and the second contacts 142 are disposed on the same block. Or, the first contacts 124 and 134 and the second contacts 142 are respectively disposed on the top surfaces of different blocks, but the application is not limited to the above. More specifically, the block may be designed to increase a disposition height of said contacts, so that electrical connections between the contacts and the body may be more reliable.

Referring back to FIG. 1 to FIG. 3A, in the present embodiment, the sensing assemblies 120 and 130 are disposed in pairs on the casing body 110. In addition, an outer surface 110c of the casing body 110 corresponding to the button portions 112 and 114 of the sensing assemblies 120 and 130 are served as a pressing region P for a set of buttons. More specifically, a rigidity of the button portions 112 and 114 of the casing body 110 corresponding to the sensing assemblies 120 and 130 is less than rigidities of other adjacent portions of the casing body 110. Therein, the rigidity refers to modulus of elasticity or bending stiffness. In other words, when the same force is applied to the button portion 112 of the casing body 110 corresponding to the sensing assembly 120 or the button portion 114 corresponding to the sensing assembly 130 (i.e., the pressing region P) and the other adjacent portions of the casing body 110, a relatively greater deformation may be provided at the button portion 112 corresponding to the sensing assembly 120 (or the button portion 114 corresponding to the sensing assembly 130) of the casing body 110. At the time, the strain sensing pattern 122a of the button portion 112 or the strain sensing pattern 132a of the button portion 114 are, for example, in a stretching state. Accordingly, the first conductive line 122 of the button portion 112 or the first conductive line 124 of the button portion 114 becomes narrower and longer, such that the strain sensing pattern 122a of the button portion 112 or the strain sensing pattern 132a of the button portion 114 may result the resistance variation accompanied with the deformation of the casing body 110, so as to generate the electrical signal.

When the body 60 detects the electrical signal, a control unit (not illustrated) disposed in the body 60 may generate a control signal according to the electrical signal, so as to control the electronic device 50 to execute the corresponding operating functions. More specifically, the sensing assemblies 120 and 130 may be units relating to volume control, and may also be elements relating to functions such as power switch, image capturing, or scroll control of display page. It should be noted that, in comparison with design of capacitive button, the seamless button design with the strain sensing pattern provided in the application is capable of significantly decreasing a chance for being accidentally touched by the user.

On the other hand, the electrical signal may react to a degree of the deformation of the corresponding strain sensing pattern 122a (or 132a) after the force is applied by the user on the button portions 112 (or 114). In other words, when the user continuously applies the force on the button portion 112 (or 114), as the force of pressing gets greater, the corresponding strain sensing pattern 122a (or 132a) results the resistance variation accompanied with the deformation of the casing body 110, such that the electrical signal may then generated in continuous. At the time, in addition to be used as a switch, the strain sensing pattern 122a (or 132a) may further be used as a controller with continuity. For instance, it may be applied in mobile phone software (e.g., browser) for scroll control of display page. Accordingly, when the user continuously applies the force on the button portion 112 (or 114), as the force of pressing gets greater, a speed for scroll control of displaying page may be increased, so as to improve flexibility for the user in operations.

In the present embodiment, a thickness of the button portion 112 (or 114) of the casing body 110 is, for example, less than thicknesses of other adjacent portions of the casing body 110. In other words, in case the casing body 110 is constituted by the same material, structural strengths or rigidities of the other adjacent portions of the casing body 110 may be distinguished by changing the thickness of the casing body 110. In other words, a greater deformation may be provided by applying the same force on the button portion 112 (or 114) of the casing body 110 with the thinner thickness to improve a sensitivity of the sensing assemblies 120 and 130.

Figure 4A:
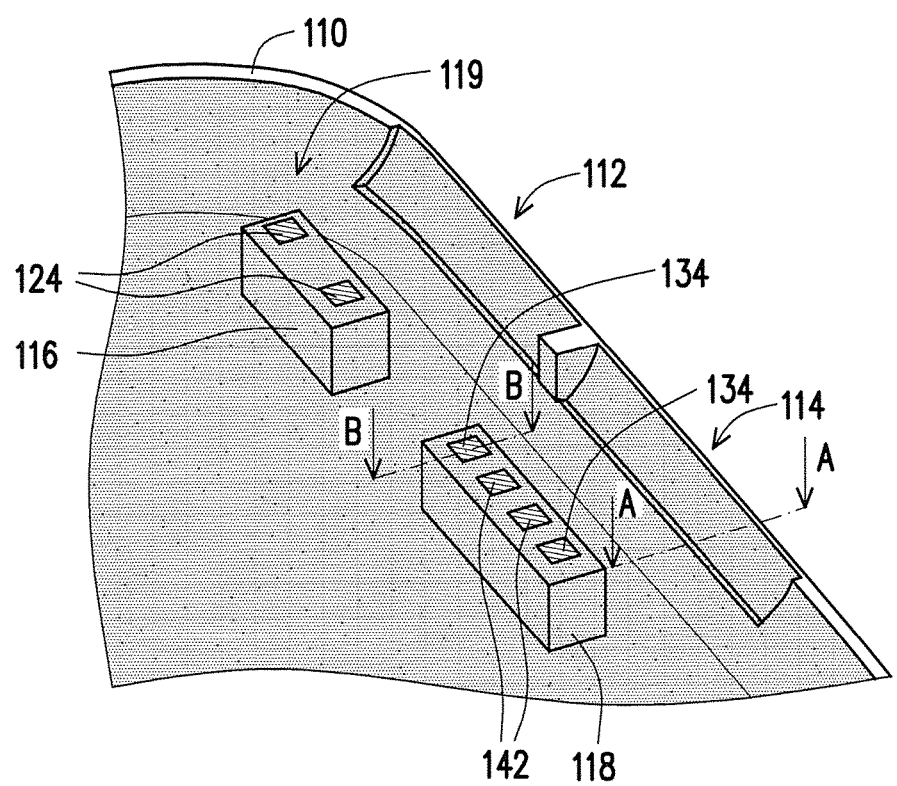
FIG. 4A is a schematic view of the protective layer coated on the inner surface of the casing depicted in FIG. 3A.
Figure 4B:
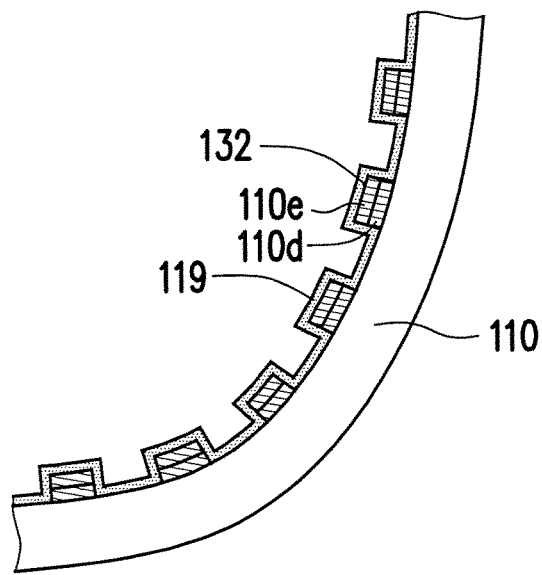
FIG. 4B is a cross-sectional view of the casing depicted in FIG. 4A taken along a sectional line A-A.
Figure 4C:
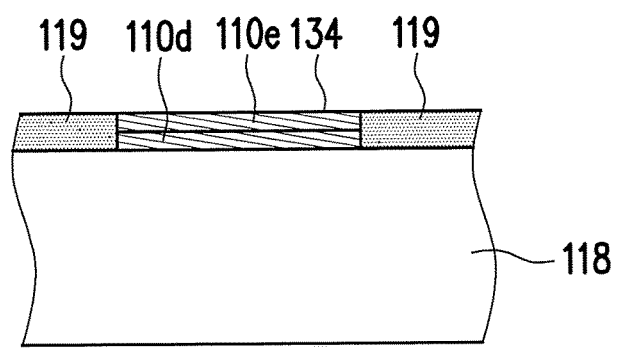
FIG. 4C is a cross-sectional view of the casing depicted in FIG. 4A taken along a sectional line B-B.

FIG. 4A is a schematic view of the protective layer coated on the inner surface of the casing depicted in FIG. 3A. FIG. 4B is a cross-sectional view of the casing depicted in FIG. 4A taken along a sectional line A-A. FIG. 4C is a cross-sectional view of the casing depicted in FIG. 4A taken along a sectional line B-B. Referring to FIG. 4A, in the present embodiment, the casing body 110 further includes a protective layer 119. The protective layer 119 is coated on the inner surface of the casing body 110 to cover the first conductive lines 122 and 132 and the antenna coil 140 (not illustrated), and to expose the first contacts 124 and 134 and the second contacts 142. More specifically, the protective layer 119 may avoid signal interferences between circuits on the casing body 110 and also prevent the circuits from oxidation. A material of the protective layer 19 is, for example, silicon oxide, silicon nitride, silicon oxynitride, non-conductive plastic or non-conductive high-molecular material.

Referring to FIG. 4B and FIG. 4C, after the sensing assemblies 120 and 130, the antenna coil 140 and the second contacts 142 are formed on the inner surface of the casing body by the laser direct structuring technology, the protective layer 119 is, for example, fully coated on the inner surface of the casing body 110. Taking the sensing assembly 130 as an example, the protective layer 119 may vary along with a rugged surface between the first conductive line 132 and the casing body 110. Naturally, the protective layer 119 also covers on the top surface of the 118, in which a thickness of the protective layer 119 is under a principle of not exceeding the height of the first contacts 134.

Figure 5:
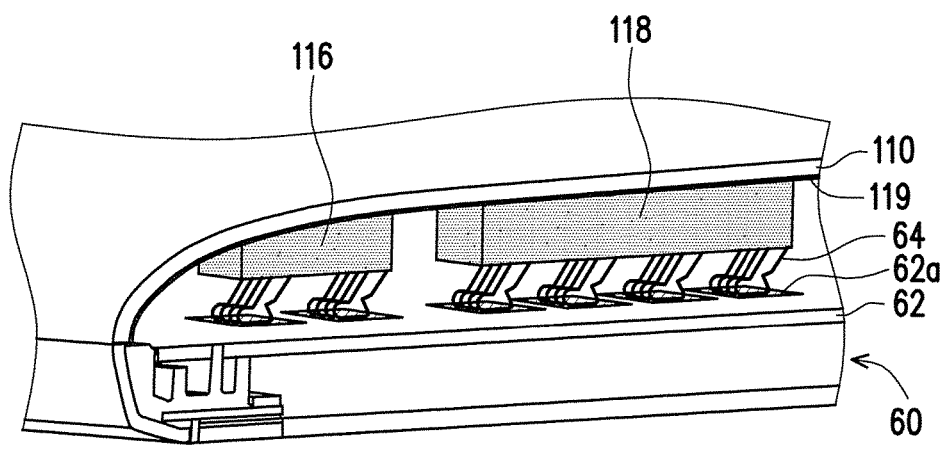
FIG. 5 is a partially enlarged view of the electronic device depicted in FIG. 1.

FIG. 5 is a partially enlarged view of the electronic device depicted in FIG. 1. Referring to FIG. 4A and FIG. 5, in the present embodiment, the body 60 includes a circuit board 62 and a plurality of elastic contacts 64. The elastic contacts 64 are disposed on the circuit board 62, and the elastic contacts 64 are propped against the first contacts 124 and 134, respectively. Generally, the elastic contacts 64 are, for example, conductive springs fixed on a plurality of pads 62a on the circuit board 62 by using methods such soldering, locking or embedding. More specifically, when the body 60 and the casing 100 are engaged to each other, the elastic contacts 64 are, for example, in a compressing state, so as to effectively ensure the electrical connection between the first contacts 124 and 134 and the circuit board 62.

In summary, in the casing of the application and the electronic device applying such casing, strain sensing assembly is formed on inner side of the button portions of the casing body (i.e., buttons) by the laser direct structuring (LDS) which is the manufacturing technology with 3D-Molded Interconnect Device (3D-MID) of laser processing, injection molding and electroplating process, so as to achieve the seamless button design. Further, the antenna coil may also be manufactured while manufacturing the strain sensing assembly. As results, processing steps may be significantly simplified; assembly time may be reduced; manufacturing costs may be lowered; and assembly yield rate may be improved. In addition, there is no gap between the casing body and the button portions since the electronic device of the application adopts the seamless button design, not only is integrity on external appearance of the electronic device maintained, dust and moist are also prevented from entering inside the electronic device thereby ensuring lifetime and reliability of the electronic device.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. A manufacturing method of a casing of an electronic device, comprising:
    forming a shell by an injection molding technology, and the shell comprising a button portion; and
    electroplating a sensing assembly on an inner surface of the shell, the sensing assembly comprising a first conductive line and two first contacts, wherein the first conductive line forms a strain sensing pattern on the button portion, and the two first contacts connect to two ends of the first conductive line, respectively; and
    forming a protective layer on the inner surface of the shell, and the protective layer covers the first conductive line and exposes the two first contacts.

2. The manufacturing method of the casing of the electronic device as recited in claim 1, wherein the step of electroplating the sensing assembly on the inner surface of the shell comprises:
    performing a roughening process on the inner surface of the shell and the roughening process comprises activating the inner surface of the shell;
    forming a seed metal layer on the inner surface; and
    electroplating an electroplating metal layer on the seed metal layer, wherein the sensing assembly comprises the seed metal layer and the electroplating metal layer.

3. The manufacturing method of the casing of the electronic device as recited in claim 2, wherein while electroplating the sensing assembly on the inner surface of the shell, electroplating a second conductive line and two second contacts, wherein the second conductive line is an antenna coil, and the two second contacts connect to two ends of the antenna coil, respectively.

4. The manufacturing method of the casing of the electronic device as recited in claim 2, wherein a material of the seed metal layer comprises tin, silver, copper, chromium or nickel.

* * * * *